No. 677,962. Patented July 9, 1901.
G. W. DOUGLAS.
TRACK BRAKE FOR RAILWAY CARS.
(Application filed Apr. 22, 1901.)
(No Model.) 2 Sheets—Sheet 1.
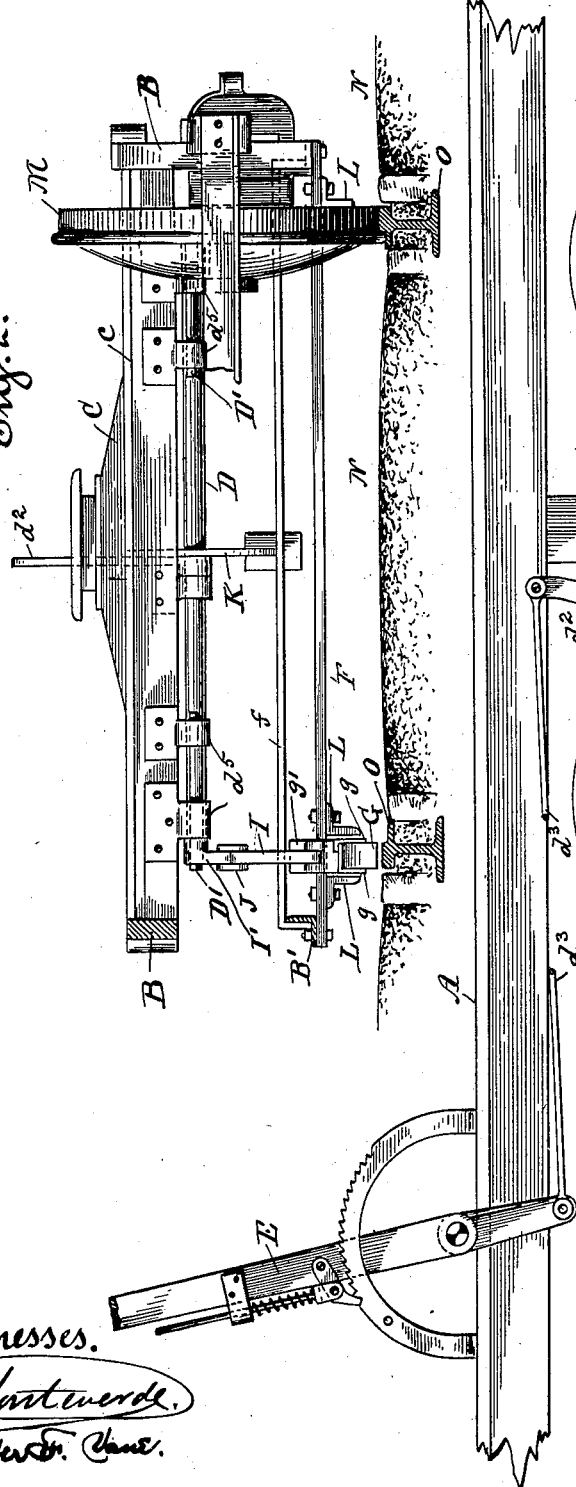
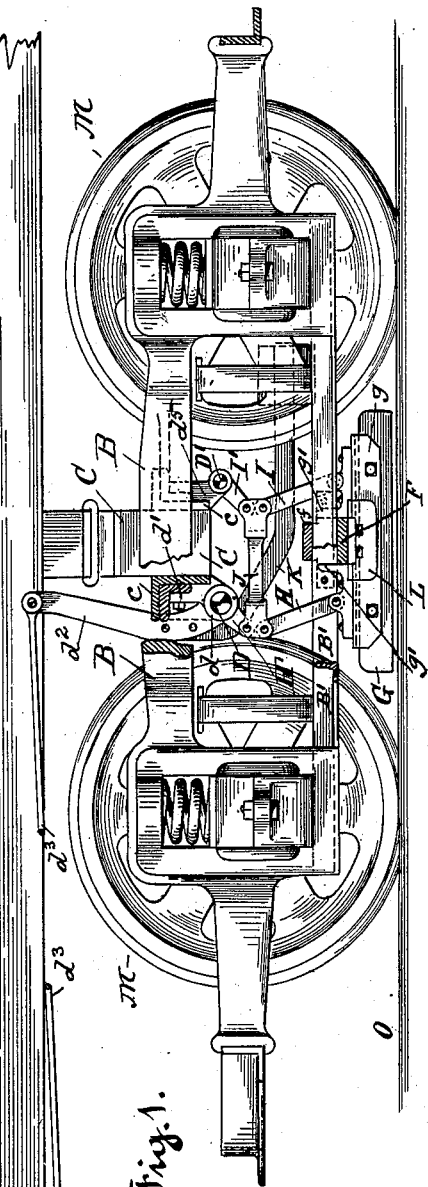

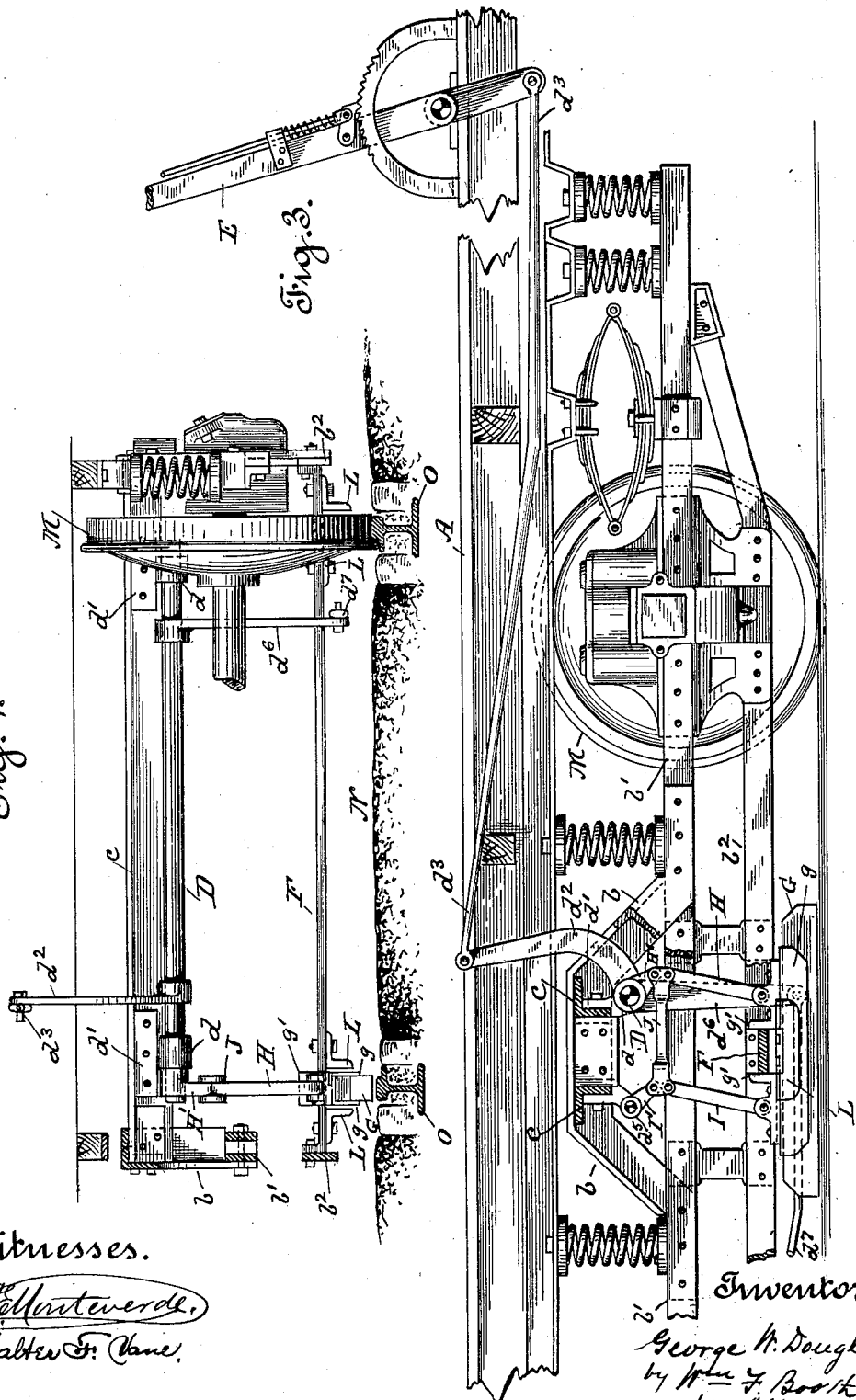

UNITED STATES PATENT OFFICE.

GEORGE W. DOUGLAS, OF SAN FRANCISCO, CALIFORNIA, ASSIGNOR TO MARKET STREET RAILWAY COMPANY, OF SAME PLACE.

TRACK-BRAKE FOR RAILWAY-CARS.

SPECIFICATION forming part of Letters Patent No. 677,962, dated July 9, 1901.

Application filed April 22, 1901. Serial No. 56,845. (No model.)

*To all whom it may concern:*

Be it known that I, GEORGE W. DOUGLAS, a citizen of the United States, residing in the city and county of San Francisco, State of California, have invented certain new and useful Improvements in Track-Brakes for Railway-Cars; and I do hereby declare the following to be a full, clear, and exact description of the same.

My invention relates to that class of track-brakes in which the brake-shoes are suspended from knee-levers operated by a rock-shaft and suitable connections.

My invention consists in certain new and useful constructions, combinations, and arrangements of parts, which I shall hereinafter fully describe and claim, and which have for their objects a more precise and forcible application of the operating power, a more perfect and stable guidance of the brake-shoes in their vertical movements to and from the rails, and generally a better construction and arrangement of the truck for the several adaptations of the brake than heretofore.

Referring to the accompanying drawings, Figure 1 is a side view of my brake as applied to a truck intended for a double-truck car. Fig. 2 is an end view of same. Fig. 3 is a side view of my brake as applied to a truck intended for a single-truck car. Fig. 4 is an end view of same.

I shall first describe the brake mechanism in its adaptation to a double-truck car.

Referring to Figs. 1 and 2, A is the floor of the car, Fig. 1. B is the top part of the truck-frame, and C is a transverse bolster having secured to its sides the angle-iron $c$. D is a transverse rock-shaft. Heretofore it has been customary to mount this shaft in short boxes shaped to fit directly in the angles of irons $c$. In this position the shaft was too high to permit a long enough lever-arm to rise from it to obtain a maximum leverage. In my invention I obviate this difficulty by mounting rock-shaft D in boxes $d$, which are formed with arms $d'$, bolted to the vertical members of one of the angle-irons $c$ and of such a length as to lower said boxes and drop the shaft to a lower plane, thereby permitting the upwardly-extending lever-arm $d^2$ of said shaft to be made longer than if the shaft were higher up, as in the usual construction. From the upper extremity of lever-arm $d^2$ the upper draw-rod $d^3$ extends to a suitable connection with the operating-lever E. By these means the shaft D is rocked. The brake-shoe G is carried by the shell or holder $g$, and said holder has pivoted to it near one end the lower member H of a knee-lever, the upper member H′ of which is connected with the rock-shaft D. There is a second knee-lever, the lower member I of which is connected with the brake-shoe holder near its other end and the upper member I′ of which is connected with a counter rock-shaft D′, which is mounted in boxes $d^5$, similar in construction to those designated by $d$, heretofore described as carrying rock-shaft D, and said boxes $d^5$ are bolted to the other angle-iron $c$, as shown. The counter rock-shaft D′ is best constructed as a short shaft, one being provided on each side of the truck, as shown in Fig. 2, to carry the knee-levers I I′ on each side. A link J, Fig. 1, connects the joints of the members of each pair of knee-levers, so that said members operate in unison. There is a brake-shoe with its holder, its pair of connected knee-levers, and short counter rock-shaft on each side of the truck. By these means when the rock-shaft D is operated the brake-shoes are forced down upon the track and again raised therefrom, a weighted arm K, secured to shaft D, assisting in this latter movement.

Heretofore the brake-shoes have been guided in their movements and held straight by means of rather light stirrups of an open character, hanging from the truck frame or bolster. These have been found insufficient to guide and hold the brake-shoes under the great strain, tending to twist or rock said shoes both laterally and endwise. In order to secure a more positive guide for the brake-shoes and to hold them rigid against such strains, I have provided a transverse bar F, carried by the lower bars B′ of the truck-frame. This bar and the lower part of the truck-frame, as shown in Fig. 2, may be stiffened and made more rigid by a cross truss-bar $f$. To the under side of this bar F are bolted the angle-guides L, between which the brake-shoe and its holder or shell move up and down and by which the shoe is positively held from any lateral rocking movement—that is, from any side tilting. Upon the top of the brake-shoe holder are vertical lugs $g'$, which pass up on each side of bar F, and these serve to hold the brake-shoe from any endwise rocking or tilting. Thus the fixed bar F serves as a base for the side guides L and the end guides $g'$, which together positively guide the brake-shoe in its movements and hold it against any lateral or end strains, which tend to throw it out of true.

The brake thus far described and illustrated by Figs. 1 and 2 is that which is adapted for double-truck cars. In such cars there is such a brake mechanism for each truck, each mechanism being separately operated, one from one end of the car and the other from the other end of the car. Thus each has applied to it the power exerted on only one lever; but where my brake mechanism is to be applied to single-truck cars it is then necessary to operate it from each end of the car, and in this case there is then applied to the single mechanism double power—that is, the power exerted on two levers, where the brake is forced down from both ends of the car simultaneously. In adapting the brake, therefore, in this regard it is necessary to materially strengthen the truck-frame and to so construct it as to resist this unusual strain.

Referring now to Figs. 3 and 4, I show the application of my brake to a truck designed for a single-truck car. It will be observed that I have in these figures designated by the same letters the parts which have been heretofore described and which remain the same. It will be needless, therefore, to again refer to them, as the changes relate chiefly to the truck-frame. It will be seen that instead of the bolster C, which I have described as carrying the angle-irons $c$ for supporting the boxes $d$ and $d^5$ of the rock-shaft D and counter rock-shafts D', said irons $c$ are carried by the upper extremities of a truss-frame, forming part of the truck-frame and comprising the inclined bars $b$, horizontal bars $b'$, and lower horizontal bars $b^2$, said bars $b'$ and $b^2$ being suitably connected. The transverse guide-bar F is secured to the lower bars $b^2$. This truss-frame gives the necessary rigidity to resist the double strain imposed upon the brake mechanism of a single-truck car. It will be seen also that in this case the rock-shaft D has not only the upwardly-extending lever-arm $d^2$, which is connected by the upper draw-rod $d^3$ with the lever E at one end of the car, but it has also the downwardly-extending lever-arm $d^6$, which is connected by the lower draw-rod $d^7$ with the operating-lever (not shown) at the other end of the car. Thus the power applied to both operating-levers may be exerted simultaneously upon the brake mechanism, and the increased strain thus imposed is properly borne by the truss-strengthened truck-frame. M represents the truck-wheels, N is the road-bed, and O represents the track-rails.

Having thus described my invention, what I claim as new, and desire to secure by Letters Patent, is—

1. A track-brake for railway-cars consisting of transverse rock and counter rock shafts, the rock-shaft having a lever-arm and suitable connections therefrom to an operating-lever, transverse irons carried by the upper portion of the truck-frame, boxes bolted to and depressed below said irons, and in which the rock and counter rock shafts are mounted, knee-levers connected with and depending from said shafts, and brake-shoes carried by the lower extremities of said knee-levers.

2. A track-brake for railway-cars consisting of transverse rock and counter rock shafts, mounted in the upper portion of the truck-frame, the rock-shaft having a lever-arm and suitable connections therefrom to an operating-lever, knee-levers connected with and depending from said shafts, brake-shoes carried by the lower extremities of said knee-levers, a transverse fixed bar carried by the lower portion of the truck-frame, and means, having said fixed bar as a base, for guiding and holding the brake-shoes true in their movement.

3. A track-brake for railway-cars consisting of transverse rock and counter rock shafts, mounted in the upper portion of the truck-frame, the rock-shaft having a lever-arm and suitable connections therefrom to an operating-lever, knee-levers connected with and depending from said shafts, brake-shoes carried by the lower extremities of said knee-levers, a transverse fixed bar carrried by the lower portion of the truck-frame, and fixed guides carried by said bar, and lying one on each side of each brake-shoe, for preventing said shoes from getting out of true sidewise.

4. A track-brake for railway-cars consisting of transverse rock and counter rock shafts, mounted in the upper portion of the truck-frame, the rock-shaft having a lever-arm and suitable connections therefrom to an operating-lever, knee-levers connected with and depending from said shafts, brake-shoes carried by the lower extremities of said knee-levers, a transverse fixed bar carried by the lower portion of the truck-frame, and fixed guides on the brake-shoes in front of and behind said fixed bar, for preventing said shoes from getting out of true endwise.

5. A track-brake for railway-cars consisting of transverse rock and counter rock shafts, mounted in the upper portion of the truck-frame, the rock-shaft having a lever-arm and suitable connections therefrom to an operating-lever, knee-levers connected with and depending from said shafts, brake-shoes carried by the lower extremities of said knee-levers, a transverse fixed bar carried by the lower portion of the truck-frame, and means, having said fixed bar as a base, for guiding and holding the brake-shoes true in their movement, consisting of fixed guides carried by said bar and lying, one on each side of each brake-shoe, and fixed guides carried by the brake-shoes in front of and behind said fixed bar.

6. A track-brake for railway-cars consisting of transverse rock and counter rock shafts, the rock-shaft having a lever-arm and suitable connections therefrom, an operating-lever, transverse irons carried by the upper portion of the truck-frame, boxes bolted to and depressed below said irons, and in which the rock and counter rock shafts are mounted, knee-levers connected with and depending from said shafts, brake-shoes carried by the lower extremities of said knee-levers, a transverse fixed bar carried by the lower portion of the truck-frame and means, having said fixed bar as a base, for guiding and holding the brake-shoes true in their movement.

7. A track-brake for railway-cars consisting of transverse rock and counter rock shafts, the rock-shaft having a lever-arm and suitable connections therefrom to an operating-lever, transverse irons carried by the upper portion of the truck-frame, boxes bolted to and depressed below said irons, and in which the rock and counter rock shafts are mounted, knee-levers connected with and depending from said shafts, brake-shoes carried by the lower extremities of said knee-levers, a transverse fixed bar carried by the lower portion of the truck-frame, fixed guides carried by said bar and lying one on each side of each brake-shoe, and fixed guides on the shoes in front of and behind said bar, whereby the shoes are guided and held true in their movement.

8. A track-brake for railway-cars consisting of transverse rock and counter rock shafts, the rock-shaft having oppositely-extending lever-arms one of said arms having a suitable connection to a lever at one end of the car, and the other having a suitable connection with a lever at the other end of the car, a truss-frame forming part of the truck and consisting of horizontal bars in different planes with inclined bars rising from the upper bars, transverse irons carried by the upper extremities of the inclined bars, boxes secured to said irons and carrying the rock and counter rock shafts, knee-levers connected with and depending from said shafts, brake-shoes carried by the lower extremities of said knee-levers, a transverse bar fixed to the lower bars of the truss-frame, and means having said fixed transverse bar for a base, for guiding and holding the brake-shoes true in their movement.

In witness whereof I have hereunto set my hand.

GEORGE W. DOUGLAS.

Witnesses:
   GEO. B. WILLCUTT,
   M. H. SHIELDS.